US006774512B2

(12) United States Patent
Takagi et al.

(10) Patent No.: US 6,774,512 B2
(45) Date of Patent: Aug. 10, 2004

(54) CLAW-POLE PERMANENT-MAGNET STEPPING MOTOR (75) Inventors: Masaaki Takagi, Tokyo (JP); Toshio Sadamitsu, Tokyo (JP); Katumi Saitou, Tokyo (JP)

(73) Assignee: Nidec Copel Corporation, Tokyo (JP)

( * ) Notice: Subject to any disclaimer, the term of this patent is extended or adjusted under 35 U.S.C. 154(b) by 82 days.

(21) Appl. No.: 09/905,000

(22) Filed: Jul. 13, 2001

(65) Prior Publication Data

US 2002/0005670 A1 Jan. 17, 2002

(30) Foreign Application Priority Data

Jul. 14, 2000 (JP) ........................................ 2000-214916

(51) Int. Cl.[7] ........................... H02K 37/14; H02K 3/46; H02K 5/22
(52) U.S. Cl. ............................... 310/49 R; 310/156.01; 310/156.08; 310/156.34; 310/156.66; 310/156.69; 310/257
(58) Field of Search ............................... 310/257, 49 R, 310/156, 156.66, 156.01, 156.08, 156.34, 156.69

(56) References Cited

U.S. PATENT DOCUMENTS

| 3,221,191 A | * | 11/1965 | Cuches et al. ................. 310/36 |
| RE25,992 E | * | 3/1966 | Molitor ........................ 310/37 |
| 3,549,918 A | * | 12/1970 | Jacques ....................... 310/112 |
| 3,691,414 A | * | 9/1972 | Kappius et al. .............. 310/164 |
| 3,755,701 A | * | 8/1973 | Culver ........................ 310/163 |
| RE28,075 E | * | 7/1974 | Kavanaugh .................. 310/156 |
| 3,991,332 A | * | 11/1976 | Kawamura et al. ......... 310/162 |
| 4,075,518 A | * | 2/1978 | Koehler et al. ........ 310/156.32 |
| 4,174,485 A | * | 11/1979 | Soden et al. ................ 220/4.21 |
| 4,672,247 A | * | 6/1987 | Madsen et al. ............. 310/181 |
| 4,714,850 A | * | 12/1987 | Akiba et al. ................ 310/112 |
| 4,792,709 A | * | 12/1988 | Smith et al. ................ 310/162 |
| 4,823,038 A | * | 4/1989 | Mizutani et al. ....... 310/156.47 |
| 4,942,325 A | * | 7/1990 | Fukaya ........................ 310/257 |
| 5,004,941 A | * | 4/1991 | Ohzeki et al. .............. 310/208 |
| 5,121,017 A | * | 6/1992 | Yamamoto et al. ........... 29/596 |
| 5,260,616 A | * | 11/1993 | Mizutani et al. ............ 310/112 |
| 5,283,487 A | * | 2/1994 | Oki et al. .................... 310/218 |
| 5,331,237 A | * | 7/1994 | Ichimura ..................... 310/44 |
| 5,648,692 A | * | 7/1997 | Watanabe et al. ............. 310/43 |
| 5,747,897 A | * | 5/1998 | Iwasa et al. ................. 310/179 |
| 5,845,390 A | * | 12/1998 | Cheng et al. ................. 29/596 |
| 5,847,485 A | * | 12/1998 | Suzuki et al. ............... 310/257 |
| 6,100,612 A | * | 8/2000 | Satoh ........................ 310/49 R |
| 6,172,440 B1 | * | 1/2001 | Sasaki et al. ........... 310/156.02 |
| 6,316,851 B1 | * | 11/2001 | Maegawa et al. ........... 310/257 |
| 6,411,003 B1 | * | 6/2002 | Sasaki et al. ........... 310/156.02 |

FOREIGN PATENT DOCUMENTS

| JP | 62164160 | * | 7/1987 | .......... H02K/37/14 |
| JP | 63014826 | * | 1/1988 | .......... H02K/37/14 |
| JP | 63215625 | * | 8/1988 | .......... H02K/37/00 |
| JP | 01128885 | * | 5/1989 | .......... H02K/37/04 |
| JP | 06014515 | * | 1/1994 | .......... H02K/37/14 |

(List continued on next page.)

Primary Examiner—Dang Le
Assistant Examiner—H. Elkassabgi
(74) Attorney, Agent, or Firm—Darby & Darby (57) ABSTRACT A claw-pole permanent-magnet stepping motor includes a pair of cases containing two or more inductors in symmetrical arrangement with multiple claw poles. The case unit has an oval shape having thin flat side walls or thin stepped side walls and connecting thick arcuate surfaces operating to resist external flux leakage from the motor and eliminating magnetic circuit obstructions. The cases, side walls, and inductors allow the motor to have a width to length ratio from about one to one to about one to two thus allowing a reduction in size and a low profile design while retaining available output torque.

10 Claims, 4 Drawing Sheets

FOREIGN PATENT DOCUMENTS

| | | | | | |
|---|---|---|---|---|---|
| JP | 08-321294 | * | 12/1996 | .......... | H02K/37/14 |
| JP | 09-049800 | * | 2/1997 | .......... | H02K/37/14 |
| JP | 09238400 | * | 9/1997 | | |
| JP | 10164812 | | 6/1998 | | |
| JP | 10-186601 | * | 7/1998 | .......... | H02K/37/14 |
| JP | 10215557 | | 8/1998 | | |
| JP | 10234171 | | 9/1998 | | |
| JP | 11089207 | | 3/1999 | | |
| JP | 00023445 | | 1/2000 | | |

* cited by examiner

Prior Art

CLAW-POLE PERMANENT-MAGNET STEPPING MOTOR

BACKGROUND OF THE INVENTION

1. Field of the Invention

The present invention relates to a claw-pole permanent-magnet stepping motor. More particularly, the present invention relates to a claw-pole permanent-magnet stepping motor that minimizes external flux leakage, minimizes magnetic circuit obstructions common in low profile designs, and reduces costs.

2. Description of the Related Art

A claw-pole permanent-magnet stepping motor is a type of hybrid stepping motor. Magnetic parts known as claw poles, form a phase A inductor and a phase B inductor in the claw-pole permanent-magnet stepping motor. Claw poles are widely used in commercial devices since they can be produced inexpensively and accurately with plate-pressing technology.

Figure 5:
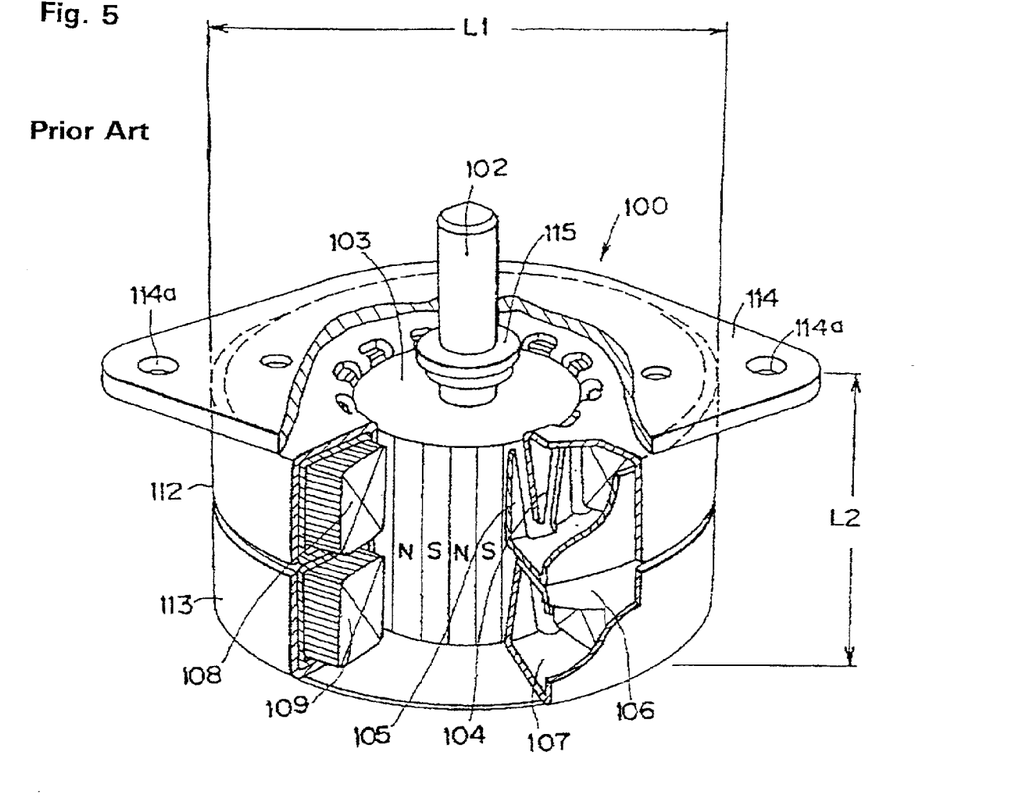
FIG. 5 is a perspective drawing of a conventional claw-pole permanent-magnet stepping motor.

Referring now to FIG. 5, a conventional claw-pole permanent-magnet stepping motor 100 includes a permanent magnet 103 secured to a rotor 102. Permanent magnet 103 is constructed and magnetized to form multiple radial poles, as shown.

Rotor 102 is rotationally supported by a bottom bearing, not shown, and secured to a case unit 113. Rotor 102, is supported at a top by a bearing 115 secured to a securing member 114 on a case unit 112. Case units 112 113 are formed from a magnetic material.

Case units 112, 113 respectively house a phase A inductor and a phase B inductor arranged symmetrically about rotor 102. The phase A inductor and the phase B inductor are formed from separate claw poles 104, 105, 106, 107. A coil 108 wraps around claw poles 104 and 105. A coil 109 wraps around claw poles 106 and 107

A diameter L1 is defined on the arcuate section of case units 112, 113. A total case unit length L2 is defined along rotor 102. Diameter L1 and length L2 are designed to form roughly a 2:1 ratio, as shown.

During operation, power is alternately applied to the phase A inductor and the phase B inductor. As a result, magnetic attraction, based on the arrangement of teeth, takes place between permanent magnet 103 and claw poles 104, 105, 106, 107. The magnetic attraction drives a stepping operation that provides rotational torque.

It should be understood that claw-pole permanent-magnet stepping motor 100 cannot be used in devices that impose restrictions on outer diameter L1 of case units 112, 113.

Additionally, devices employing claw-pole permanent-magnet stepping motor 100 must provide a wide attachment area since motor 100 is secured to the device using bolts and nuts via a set of securing holes 114a, 114a formed on securing member 114 of case unit 112.

OBJECTS AND SUMMARY OF THE INVENTION

It is an object of the present invention to provide a claw-pole permanent-magnet stepping motor that overcomes the issues described above.

It is another object of the present invention to provide a claw-pole permanent-magnet stepping motor that may be attached or internally disposed in devices that impose outer dimension restrictions on a case unit.

It is another object of the present invention to provide a claw-pole permanent-magnet stepping motor that eliminates magnetic circuit obstructions that accompany low-profile designs.

It is another object of the present invention to provide a claw-pole permanent-magnet stepping motor that limits external flux leakage.

It is another object of the present invention to provide a claw-pole permanent-magnet stepping motor that employs a case unit that can be produced simply and with high precision.

It is another object of the present invention to provide a claw-pole permanent-magnet stepping motor that includes a case unit formed with a lateral cross-section shaped roughly as an oval shape with flat sides, flat side walls, and continuously formed thick arcuate sections.

It is another object of the present invention to provide a claw-pole permanent-magnet stepping motor where a total length of a case unit along the longitudinal axis of the rotor to a diameter of arcuate sections of a pair of case units is a ratio of at least 1:1 and preferably a ratio of 2:1.

It is another object of the present invention to provide a claw-pole permanent-magnet stepping motor where a permanent magnet faces a phase A inductor and a phase B inductor to provide adequate rotational torque during operation.

Briefly stated, the present invention relates to a claw-pole permanent-magnet stepping motor that includes a pair of cases containing two or more inductors in symmetrical arrangement with multiple claw poles. The case unit has an oval shape having thin flat side walls or thin stepped side walls and connecting thick arcuate surfaces operating to resist external flux leakage from the motor and eliminating magnetic circuit obstructions. The cases, side walls, and inductors allow the motor to have a width to length ratio from about one to one to about one to two thus allowing a reduction in size and a low profile design while retaining output torque.

According to an embodiment of the present invention there is provided a claw-pole permanent-magnet stepping motor, comprising: a first and a second case unit having a total length, a rotor having at least a first and a second permanent magnet, the first and the second case units having a shape supporting the rotor, a third and a fourth arcuate section on each the first and the second case units, a fifth and a sixth side wall section joining each respective the third and forth arcuate sections in a continuous flattened-oval shape about the rotor, the third and the forth arcuate sections each having a first diameter, and a ratio of the total length to the first diameter is at least 1:1, whereby the claw-pole permanent magnet stepping motor has a reduced size, eliminates magnetic circuit obstructions, and prevents external flux leakage to allow use with magnetic devices while providing an adequate rotational torque.

According to another embodiment of the present invention there is provided a claw-pole permanent-magnet stepping motor, wherein: the ratio is preferably 2:1 whereby the claw-pole permanent magnet stepping motor has a reduced size while providing adequate rotational torque despite the ratio.

According to another embodiment of the present invention there is provided a claw-pole permanent-magnet stepping motor, wherein: the third and the fourth arcuate sections each have a first thickness, the fifth and the sixth wall sections each have a second thickness, and the first thickness being greater than the second thickness, whereby size is reduced, magnetic circuit obstructions are eliminated, and external flux leakage is minimized.

According to another embodiment of the present invention there is provided a claw-pole permanent-magnet stepping motor, wherein: the fifth and the sixth sections each having a planar shape and being closer to the rotor than the third and the fourth arcuate sections, and the at least first case unit having a flattened-oval cross section, whereby the claw-pole permanent magnet stepping motor has a reduced size.

According to another embodiment of the present invention there is provided a claw-pole permanent-magnet stepping motor, further comprising: a first thin wall section on each the fifth and the sixth sections orthogonal each the third and the fourth arcuate sections, the first thin wall section having a third thickness, and the third thickness being less than the second thickness, whereby the claw-pole permanent magnet stepping motor may be made with an increased torque while retaining a same external size.

According to another embodiment of the present invention there is provided a claw-pole permanent-magnet stepping motor, further comprising: a first metal bearing in the first case unit, a second metal bearing in the second case unit, the rotor supported between the first and the second metal bearings, a plurality of poles on the first and second permanent magnets, a first and a second phase inductor in each respective the first and the second unit case opposite each respective the first and second permanent magnet, the first and the second phase inductors disposed symmetrically in each respective the first and the case units, and the first and the second phase inductors each formed from at least a first and a second magnetic plate each including multiple claw-poles and a first and a second coil each with a set of connectors, whereby the adequate rotational torque is created.

According to another embodiment of the present invention there is provided a claw-pole permanent-magnet stepping motor, comprising: a first and a second case unit having a total length, the first and the second case units including a magnetic material, a rotor having at least a first and a second permanent magnet, the first and the second case units having a shape supporting the rotor, a third and a fourth arcuate section on each the first and the second case units, a fifth and a sixth side wall section joining each respective the third and forth arcuate sections in a continuous flattened-oval shape about the rotor, the third and the forth arcuate sections each having a first diameter, a ratio of the total length to the first diameter is preferably 2:1, the third and the fourth arcuate sections each have a first thickness, the fifth and the sixth wall sections each have a second thickness, the first thickness being greater than the second thickness, the fifth and the sixth sections each having a planar shape and being closer to the rotor than the third and the fourth arcuate sections, the at least first case unit having a flattened-oval cross section, whereby the claw-pole permanent magnet stepping motor has a reduced size, eliminates magnetic circuit obstructions, and prevents external flux leakage to allow use with magnetic devices while providing an adequate rotational torque, a first metal bearing in the first case unit, a second metal bearing in the second case unit, the rotor supported between the first and the second metal bearings, a plurality of poles on the first and second permanent magnets, a first and a second phase inductor in each respective the first and the second unit case opposite each respective the first and second permanent magnet, the first and the second phase inductors disposed symmetrically in each respective the first and the case units, and the first and the second phase inductors each formed from at least a first and a second magnetic plate each having multiple claw-poles and a first and a second coil each with a set of connectors, whereby the adequate rotational torque is created.

According to another embodiment of the present invention there is provided a claw-pole permanent-magnet stepping motor, comprising: a first and a second case unit, the first case unit and the second case unit having a first total length, a rotor including a first and a second permanent magnet, the first and the second case units including a magnetic material, the first and the second case units having a shape supporting the rotor, a permanent magnet magnetized to form a plurality of poles, the permanent magnet on the roter, a first phase inductor, a second phase inductor, the first and the second phase inductors disposed symmetrically in each respective the case unit, the first and the second phase inductors each including at least a plurality of claw poles and a coil, the first and the second case units having a first diameter, and a ratio of the first total length to the first diameter is at least 1:1, whereby the claw-pole permanent magnet stepping motor has a reduced size, eliminates magnetic circuit obstructions, and prevents external flux leakage to allow use with magnetic devices while providing an adequate rotational torque.

According to another embodiment of the present invention there is provided a claw-pole permanent-magnet stepping motor, wherein: the ratio is preferable 2:1, whereby the adequate rotational torque is maintained.

According to another embodiment of the present invention there is provided a claw-pole permanent-magnet stepping motor, further comprising: a securing section detachably attached to an outside side surface of at least one of the first and the second case unit, a securing section containing an externally threaded section, and the securing section being detatachably fixable to an external attachment base for the claw-pole permanent magnet stepping motor, whereby the claw-pole permanent magnet stepping motor may be easily affixed to an external device.

According to another embodiment of the present invention there is provided a claw-pole permanent-magnet stepping motor, wherein: each of the first and the second phase inductors includes the coil and a magnetic plate formed integrally from a magnetic material, each the magnetic plate having a shape, including a flat oval-shaped section and an extending plurality of claw-poles, for sliding insertion in each respective the first and the second case unit, whereby assembly time is reduced and efficiency increased.

According to another embodiment of the present invention there is provided a claw-pole permanent-magnet stepping motor, wherein: each coil includes a coil bobbin, an insulated copper wire wrapped around the coil bobbin, and a connector, the coil bobbin including a first and a second collar, the connector disposed at at least one of the first and the second collar orthogonal to the coil, and the coil bobbin having a flat oval shape with arcuate sections, whereby the coils are quickly install-able inside each respective the first and the second case units.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

The present applicant has proposed a claw-pole permanent-magnet stepping motor as described in Japanese laid-open patent publication number 11-89207. In this publication, the diameter of the arcuate sections of the case unit and the total length of the case unit along the rotor are set up to have a roughly 2:1 ratio, allowing adequate rotational torque to be generated.

In the publication, the lateral cross-section of the case unit is formed from flat side walls and arcuate surfaces continuous therewith, thus forming an oval shape with flat sides. The teeth of the claw poles forming the phase A inductor and the phase B inductor are arranged so that there are no teeth facing the flat side wall sections, and openings are formed on the side wall sections. By providing flat sections, the motor can be attached to devices that impose restrictions on the outer dimension L1 of the case unit.

With a claw-pole permanent-magnet stepping motor based on this publication, some rotational torque can be provided and the motor can be placed inside devices that impose some restrictions on the diameter L1 of the arcuate sections of the case unit.

Unfortunately in this design, leakage of magnetic flux from the openings formed on the side walls of the case unit prevent the motor from being used in magnetic devices and opto-magnetic devices. Additionally, where the motor case is made by a pressing operation, a single pressing step forms only the outer shape and another pressing step is required to form the openings. As a result, the pressing operation is complex and additionally costly.

Figure 1A:
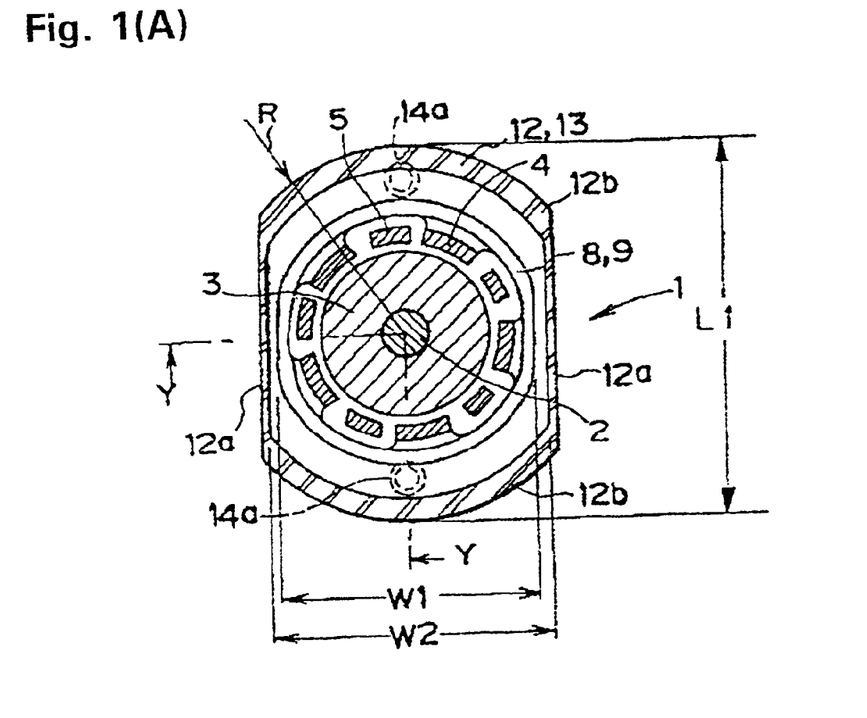
FIG. 1(A) is a lateral cross-section drawing of a claw-pole permanent-magnet stepping motor.
Figure 1B:
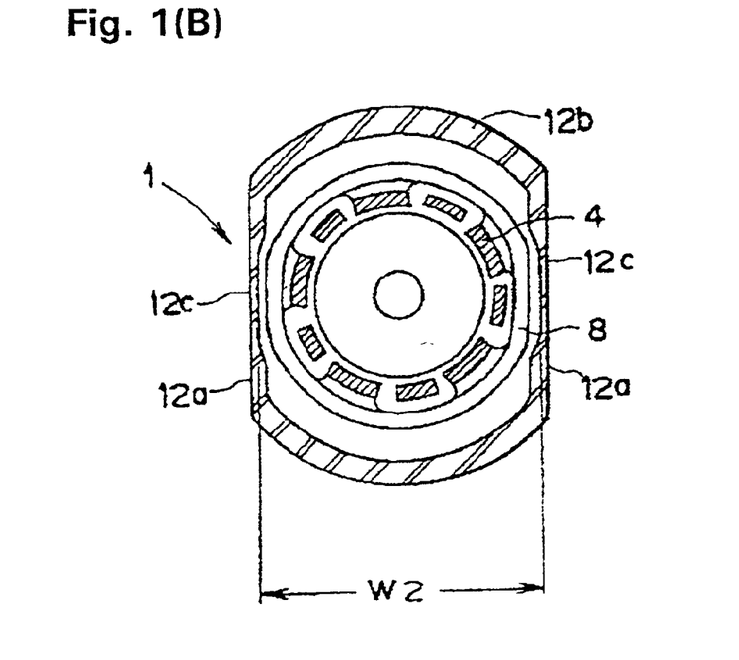
FIG. 1(B) is a lateral cross-section drawing of an alternative embodiment of a claw-pole permanent-magnet stepping motor.
Figure 2:
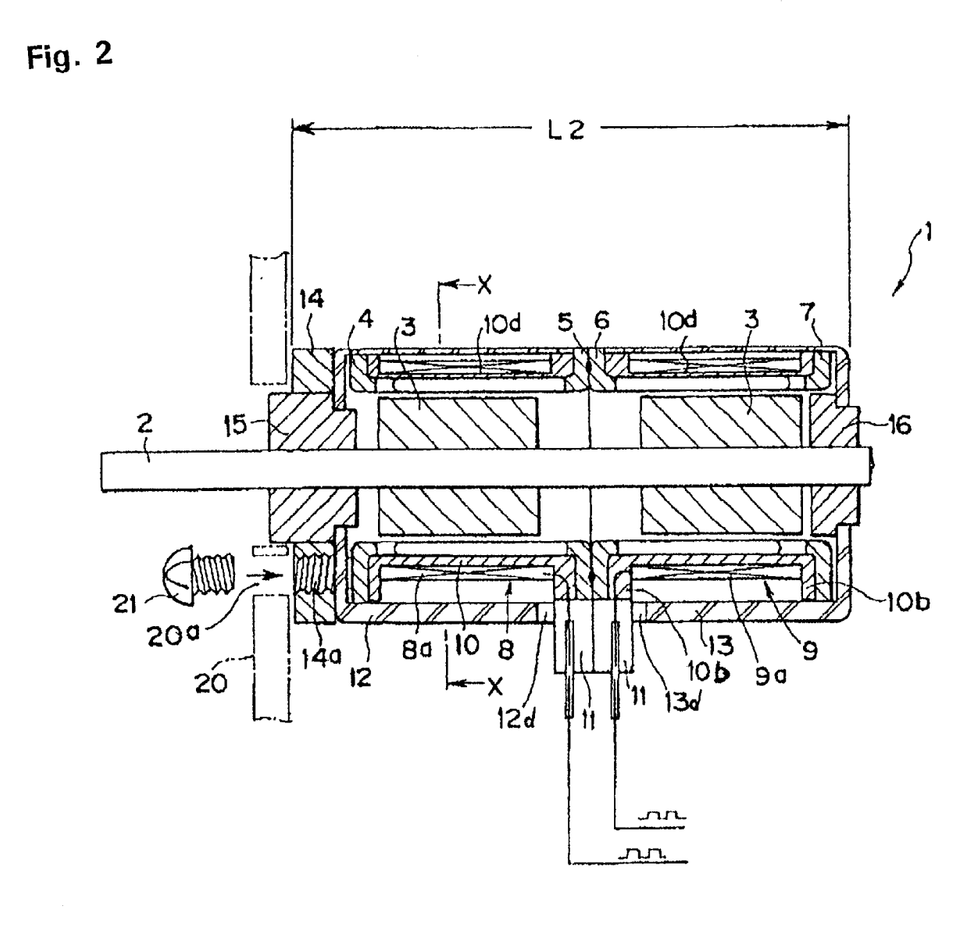
FIG. 2 is a cross-section drawing of FIG. 1(A) as seen from the X—X line.

Referring now to FIGS. 1(A), 1(B), and 2, a claw-pole permanent-magnet stepping motor 1 includes a rotor formed from a rotation shaft 2 having two permanent magnets 3. Permanent magnets 3 are magnetized to form 10 poles, as will be explained.

Rotation shaft 2 is rotatably supported by left and right metal bearings 15, 16. Metal bearing 15 is pressed into a securing member 14 and is fixed, frequently by spot-welding, to a section of the side surface of a case unit 12. Securing member 14 is formed with threaded holes 14a, as will be explained. During assembly, when attaching securing member 14 to an attachment base 20 of a main device (not shown), a set of screws 21 are inserted through a corresponding set of securing holes 20a and threaded into threaded holes 14a. Screws 21 attach motor 1 to the main device with minimal interference and a reduced area requirement.

In another embodiment, where screws 21 are required to have a very small size, securing member 14 may be eliminated, and case unit 12 may serve as a securing unit itself.

A second case unit 13 is symmetrical to case unit 12, and metal bearing 16 is in a side surface of case unit 13.

Case units 12, 13 are formed by pressing magnetic plates containing magnetic soft-iron. The impact of case units 12, 13 on external magnetic flux leakage will be described later.

Case units 12, 13 form an flattened-oval-type shape having respective flat side walls 12a, 13a and respective arcuate sections 12b, 13b. The arcuate sections 12b, 13b, each have a radius R, defined from a center of rotation shaft 2. The thickness of arcuate sections 12b, 13b are not substantially restricted and may be fairly thick to retain a magnetic field. As a result, when power is provided to motor 1, a closed magnetic circuit is formed with an unobstructed magnetic circuit passing through case units 12, 13. Thus, since the unobstructed magnetic circuit is retained in case units 12, 13, external flux is minimized and the magnetic field created is prevented from being a problem to a manufacturer or user.

A distance W2 is defined between the inner wall surfaces of respective flat side walls 12a, 13a. Distance W2 provides clearance for an outer diameter W1 of the phase A and phase B inducers. The phase A and phase B inducers are respectively formed from claw poles and coils, as will be explained.

Side walls 12a are pressed thinner than arcuate sections 12b. To increase flatness, the ratio between the thickness of side walls 12a, 13a and the thickness of arcuate sections 12b, 13b is set to about ½–⅓. Desirable motor 1 flatness may be provided by pressing the unit in this manner while retaining operational effectiveness and efficiency.

In an alternative embodiment, a set of thin-wall sections 12c can be formed so that the thickness of respective side walls 12a is reduced in stages. A corresponding similar construction on case unit 13 (not shown in this embodiment) provides similar benefits for the second permanent magnet 3.

The alternative embodiment described allows an increased number of windings of respective insulated copper lines and a corresponding increase in power.

Figure 3:
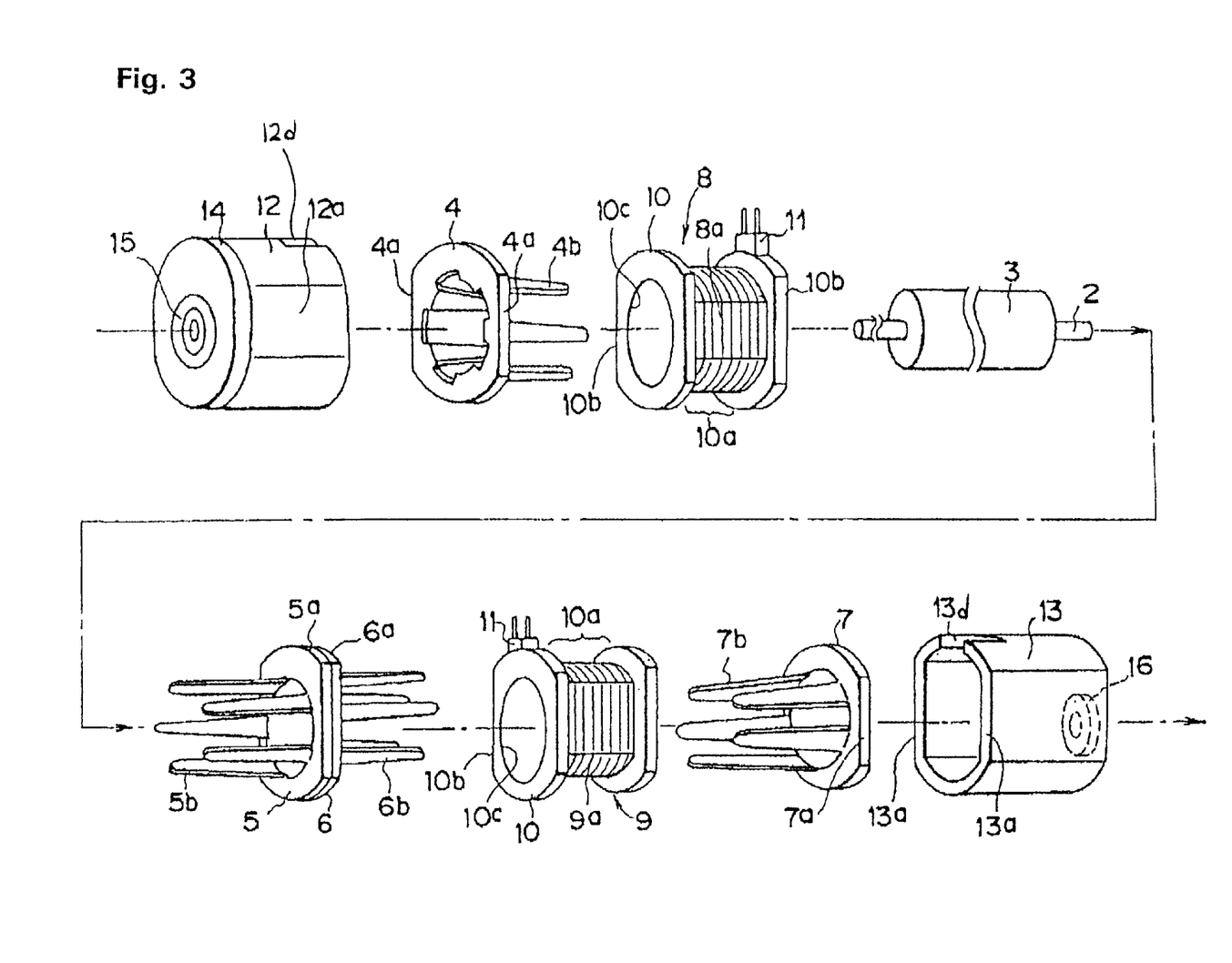
FIG. 3 is an exploded drawing of a claw-pole permanent-magnet stepping motor.

Referring additionally now to FIG. 3, phase A includes a coil 8 with windings of an insulated copper line 8a. Phase B includes a coil 9 with windings of an insulated copper line 9a. Coils 8, 9 are formed from respective coil bobbins 10, 10. Coil bobbins 10, 10 each include a coil section 10a, formed integrally from a plastic resin. Coil bobbins 10 have a pair of collars 10b at each end.

Coil sections 10a are each formed with an oval shape having flat sides surrounding a circular inner hole 10c. A pair of thin wall sections 10d correspond to respective side walls 12a, 13a or thin-wall sections 12c, 13c depending upon the embodiment. Since, coil bobbins 10 have an oval shape with flat sides, insulated copper lines 8a, 9a also form a roughly oval shape with flat sides.

A set of magnetic plates 4, 5, 6, 7, are formed from a magnetic material, and include respective flat sections 4a, 5a, 6a, 7a. Magnetic plates 4, 5, 6, and 7 have an oval shape with flat sides and are formed for insertion into respective case units 12, 13 during assembly. Claw poles 4b, 5b, 6b, and 7b, each include five poles formed in these flat sections by a drawing process and project away from respective magnetic plates 4, 5, 6, and 7 in a circular-type arrangement.

Case units 12, 13 include recesses 12d, 13d formed and positioned to accept a respective pair of connectors 11 during assembly.

During assembly, the phase A inductor and the phase B inductor are formed by inserting coils 8, 9 wrapped around respective coil bobbins 10, 10 onto respective claw poles 4, 5, 6, 7. Connectors 11, containing electrodes (not shown), connect to each respective coil 8, 9 on coil bobbins 10, 10 and provide electrical power to each phase inductor during operation Connectors 11 are on one collar 10b of each respective coil bobbin 10 along a center section of motor 1. During operation, drivers (not shown) connected to connectors 11 alternately send power to the phase A inductor and the phase B inductor so that magnetic induction takes place between respective claw-poles 4b, 5b, 6b, 7b and permanent magnets 3, 3 based on the arrangement of claw-poles. The allows stepped operation that provides adequate rotational torque.

To provide a ratio 1: greater than 1 between diameter L1 and case unit length L2, along the rotation shaft 2, during construction the ratio is set to about 1:2. This ratio allows adequate rotational torque even if claw-pole permanent-magnet stepping motor 1 is very low-profile with a maximum diameter of no more than 8 mm.

Figure 4:
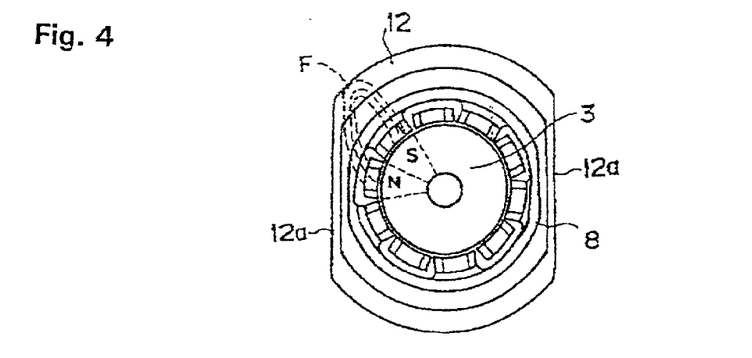
FIG. 4 is a lateral cross-section drawing of a claw-pole permanent-magnet stepping motor when power is applied.

Referring additionally now to FIG. 4, during operation, a closed magnetic circuit F, (shown by dotted lines), passes through thick arcuate sections 12b(13b not shown) of case unit 12 (13 not shown) with out restriction. Since magnetic circuit F is not obstructed, it will not obstruct the generated magnetic field. Furthermore, since side walls 12a, 13a (not shown) are continuous, they prevent magnetic flux from leaking outside case units 12, 13 (not shown). As a result, the device may be used in both magnetic and opto-magnetic devices.

It should be understood, that as described above, the present invention provides a claw-pole permanent-magnet stepping motor 1 that may be attached or internally disposed in devices that impose outer dimension restrictions on a case unit. It is to be further understood, that magnetic circuit obstructions, that frequently accompany low-profile designs, are be eliminated. External flux leakage is prevented and the case unit can be produced inexpensively and simply and with high precision.

It should be further understood, that diameter L1 of arcuate sections 12b, 13b, is designed preferably to have a ratio of about 1:2 with total length L2 of motor 1, thus allowing adequate rotational torque to be generated. It should be understood, that ratios of about 1:1 are possible according to customer demand but not preferable.

It should be further understood, that since case units 12, 13 have only end openings, external flux leakage is reduced thereby allowing use of the present invention in magnetic and opto-magnetic components.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described or suggested herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A claw-pole permanent magnet stepping motor, comprising:

a first case unit having a length wherein said first case unit is continuous along its length;

a second case unit having a length wherein said second case unit is continuous along its length;

said first and said second case units having a total length;

a rotor having at least a first and a second permanent magnet;

said first and said second case units having a shape supporting said rotor;

a third and a fourth arcuate section on each said first and said second case units;

a fifth and a sixth side wall section joining each respective said third and forth arcuate sections in a continuous flattened-oval section about said rotor;

said third and said forth arcuate sections each having a first diameter; and a ratio of said total length to said first diameter is at least 1:1 a first metal bearing in said first case unit;

a second metal bearing in said second case unit;

said rotor supported between said first and said second metal bearings;

a plurality of magnetic poles on said first and second permanent magnets;

a first and a second phase inductor in each respective said first and said second unit case opposite each respective said first and second permanent magnets;

said first and said second phase inductors disposed symmetrically in each respective said first and said second case units; and said first and said second phase inductors each formed from at least a first and a second magnetic plate each including multiple claw-poles and a first and a second coil each with a set of connectors, at least one of said claw-poles facing the continuous flattened-oval section of the fifth and sixth side walls whereby said claw-pole permanent magnet stepping motor has a reduced size, eliminates magnetic circuit obstructions, and prevents external flux leakage to allow use with magnetic devices while providing an adequate rotational torque.

2. A claw-pole permanent magnet stepping motor, according to claim 1, wherein:

said ratio is preferably 2:1 whereby said claw-pole permanent magnet stepping motor has a reduced size while providing adequate rotational torque despite said ratio.

3. A claw-pole permanent magnet stepping motor comprising:

a first case unit having a length wherein said first case unit is continuous along its length;

a second case having a length wherein said second case unit is continuous along its length;

said first and said second case units having a total length;

a rotor having at least a first and a second permanent magnet;

said first and said second case units having a shape supporting said rotor;

a third and a fourth arcuate section on each said first and said second case units;

a fifth and a sixth side wall section joining each respective said third and fourth arcuate sections in a continuous flattened-oval section about said rotor;

said third and said fourth arcuate sections each having a first diameter; and a ratio of said total length to said first diameter is at least 1:1, whereby said claw-pole permanent magnet stepping motor has a reduced size, eliminates magnetic circuit obstructions, and prevents external flux leakage to allow use with magnetic devices while providing an adequate rotational torque;

said third and said fourth arcuate sections each have a first thickness;

said fifth and said sixth wall sections each have a second thickness; and said first thickness being greater than said second thickness, whereby size is reduced, magnetic circuit obstructions are eliminated, and external flux leakage is minimized;

said fifth and said sixth wall sections each having a planar shape and being closer to said rotor than said third and said fourth arcuate sections; and said at least first case unit having a flattened-oval cross section, whereby said claw-pole permanent magnet stepping motor has a reduced size;

a first thin wall section on each said fifth and said sixth sections orthogonal each said third and said fourth arcuate sections;

said first thin wall section having a third thickness; and said third thickness being less than said second thickness, whereby said claw-pole permanent magnet stepping motor may be made with an increased torque while retaining a same external size.

4. A claw-pole permanent magnet stepping motor, comprising:

a first case unit having a length wherein said first case unit is continuous along its length;

a second case having a length wherein said second case unit is continuous along its length;

a first and a second case unit having a total length wherein a material forming said first and second case units is magnetic;

a rotor having at least a first and a second permanent magnet;

said first and said second case units having an oval shape supporting said rotor;

a third and a fourth arcuate section on each said first and said second case units;

a fifth and a sixth side wall section joining each respective said third and forth arcuate sections in a continuous flattened-oval shape about said rotor;

said third and said forth arcuate sections each having a first diameter;

said total length and said first diameter having a ratio of at least 1:1;

said third and said fourth arcuate sections each have a first thickness;

said fifth and said sixth wall sections each have a second thickness;

said first thickness being greater than said second thickness;

said fifth and said sixth sections each having a planar shape and being closer to said rotor than said third and said fourth arcuate sections;

said at least first case unit having a flattened-oval cross section, whereby said claw-pole permanent magnet stepping motor has a reduced size, eliminates magnetic circuit obstructions, and prevents external flux leakage to allow use with magnetic devices while providing an adequate rotational torque;

a first metal bearing in said first case unit;

a second metal bearing in said second case unit;

said rotor supported between said first and said second metal bearings;

a plurality of magnetic poles on said first and second permanent magnets;

a first and a second phase inductor in each respective said first and said second unit case opposite each respective said first and second permanent magnet;

said first and said second phase inductors disposed symmetrically in each respective said first and said case units; and said first and said second phase inductors each formed from at least a first and a second magnetic plate each having multiple claw-poles and a first and a second coil each with a set of connectors, at least one of said claw-poles facing the continuous flattened-oval section of the fifth and sixth side walls whereby said adequate rotational torque is created.

5. A claw-pole permanent magnet stepping motor, according to claim 4, wherein:

said ratio is preferably 2:1.

6. A claw-pole permanent magnet stepping motor, comprising:

a first case unit having a length wherein said first case unit is continuous along its length;

a second case having a length wherein said second case unit is continuous along its length;

said first case unit and said second case unit having a first total length wherein a material forming said first and second case units is magnetic;

a rotor including a first and a second permanent magnet;

said first and said second case units having an oval shape which comprises an arcuate section and a flattened-oval section supporting said rotor;

a permanent magnet magnetized to form a plurality of poles;

said permanent magnet on said rotor;

a first phase inductor;

a second phase inductor;

said first and said second phase inductors disposed symmetrically in each respective said case unit;

said first and said second phase inductors each including at least a plurality of claw poles and a coil at least one of said claw-poles facing the continuous flattened-oval section of the case units;

said first and said second case units having a first diameter; and a ratio of said first total length to said first diameter is at least 1:1, whereby said claw-pole permanent magnet stepping motor has a reduced size, eliminates magnetic circuit obstructions, and prevents external flux leakage to allow use with magnetic devices while providing an adequate rotational torque.

7. A claw-pole permanent magnet stepping motor, according to claim 6, wherein:

said ratio is preferably 2:1, whereby said adequate rotational torque is maintained.

8. A claw-pole permanent magnet stepping motor, according to claim 7, further comprising:

a securing section detachably attached to an outside side surface of at least one of said first and said second case unit;

a securing section containing an externally threaded section; and said securing section being detatachably fixable to an external attachment base for said claw-pole permanent magnet stepping motor, whereby said claw-pole permanent magnet stepping motor may be easily affixed to an external device.

9. A claw-pole permanent magnet stepping motor, according to claim 8 wherein:

each said first and said second phase inductor includes said coil and a magnetic plate formed integrally from a magnetic material;

each said magnetic plate having an oval shape, including a flat oval-shaped section and an extending plurality of claw-poles, for sliding insertion in each respective said first and said second case unit, whereby assembly time is reduced and efficiency increased.

10. A claw-pole permanent magnet stepping motor, according to claim 9, wherein:

each said coil includes a coil bobbin; an insulated copper wire wrapped around said coil bobbin, and a connector;

said coil bobbin including a first and a second collar;

said connector disposed at at least one of said first and said second collar orthogonal to said coil; and said coil bobbin having a flat oval shape with arcuate sections, whereby said coils are quickly install-able inside each respective said first and said second case units.

* * * * *

UNITED STATES PATENT AND TRADEMARK OFFICE
CERTIFICATE OF CORRECTION

PATENT NO. : 6,774,512 B2
DATED : August 10, 2004
INVENTOR(S) : Masaaki Takagi et al.

It is certified that error appears in the above-identified patent and that said Letters Patent is hereby corrected as shown below:

Title page,
Item [73], Assignee, please delete "Nidec Copel Corporation" and substitute -- Nidec Copal Corporation --.

Signed and Sealed this

Fourth Day of January, 2005

JON W. DUDAS
*Director of the United States Patent and Trademark Office*